United States Patent
Xia

(10) Patent No.: US 9,665,921 B2
(45) Date of Patent: May 30, 2017

(54) ADAPTIVE OPENGL 3D GRAPHICS IN VIRTUAL DESKTOP INFRASTRUCTURE

(71) Applicant: FutureWei Technologies, Inc., Plano, TX (US)

(72) Inventor: Guangsong Xia, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 318 days.

(21) Appl. No.: 13/730,876

(22) Filed: Dec. 29, 2012

(65) Prior Publication Data

US 2014/0184622 A1 Jul. 3, 2014

(51) Int. Cl.
*G06T 1/20* (2006.01)
*G06F 9/455* (2006.01)

(52) U.S. Cl.
CPC ............ *G06T 1/20* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 8,200,796 B1* | 6/2012 | Margulis | 709/223 |
| 2005/0235287 A1* | 10/2005 | Harper | 718/100 |
| 2008/0276262 A1* | 11/2008 | Munshi et al. | 719/328 |
| 2010/0115510 A1* | 5/2010 | Ford et al. | 718/1 |
| 2010/0262722 A1* | 10/2010 | Vauthier et al. | 710/8 |
| 2011/0050712 A1* | 3/2011 | Jackson | 345/503 |
| 2011/0102443 A1* | 5/2011 | Dror et al. | 345/522 |
| 2011/0134111 A1* | 6/2011 | Stone | 345/419 |
| 2012/0069032 A1* | 3/2012 | Hansson et al. | 345/522 |
| 2012/0075316 A1* | 3/2012 | Kim et al. | 345/522 |
| 2012/0149464 A1* | 6/2012 | Bone et al. | 463/30 |

* cited by examiner

*Primary Examiner* — Barry Drennan
*Assistant Examiner* — Jason Pringle-Parker
(74) *Attorney, Agent, or Firm* — Slater Matsil, LLP

(57) ABSTRACT

System and method embodiments are provided for enabling OpenGL graphics rendering on VM architecture. In an embodiment, a method implemented in a system comprising multiple virtual machines (VMs) includes intercepting, at a first VM that does not have direct access to a graphics processing unit (GPU), a command from an application to render graphics. The method further includes processing the command using hardware based GPU rendering at a second VM that has direct access to a GPU upon determining that the GPU is free or has capacity to handle workload of the command or processing the command using CPU based software rendering at the first VM upon determining that the GPU of the second VM is busy or does not have capacity to handle workload of the command and the graphics data.

12 Claims, 3 Drawing Sheets

ADAPTIVE OPENGL 3D GRAPHICS IN VIRTUAL DESKTOP INFRASTRUCTURE

TECHNICAL FIELD

The present invention relates to graphics processing, and, in particular embodiments, to a system and method for adaptive OpenGL 3D graphics in virtual desktop infrastructure (VDI).

BACKGROUND

Open Graphics Library (OpenGL) is a standard specification that defines a cross-language and multi-platform (e.g., an application programming interface (API)) for writing applications and simulating physics, which produce two-dimensional (2D) and three-dimensional (3D) computer graphics. OpenGL is used in different graphics applications, such as Computer Aided Design (CAD) applications. OpenGL supports hardware based rendering for 3D graphics using a graphics processing unit (GPU), where hardware vendors can provide drivers for GPU rendering. Software based rendering is also possible with OpenGL using open source community produced software independent of GPU hardware vendors. Software based rendering can be achieved without using a GPU, e.g., using a central processing unit (CPU) instead.

In applications where graphics processing is implemented remotely on a virtual machine (VM) at a remote server, for example via a remote desktop or virtual desktop infrastructure (VDI), OpenGL rendering (e.g., for 3D graphics) on the VM is achieved with hardware using GPU instead of software based rendering. Software based rendering using CPU may be possible on the VM, but may also reduce performance (e.g., in terms of processing speed and/or memory). However, a plurality of VMs may share a limited number of GPUs, such as at a hypervisor, due to cost and possibly other resource limitations. For example, one or few VMs may directly access and use one or few corresponding GPUs, while the remaining VMs in the system may not have access to a GPU. In such cases, the VMs without GPU access can only implement software based rendering using CPU processing, which could reduce overall system performance for OpenGL rendering of 3D graphics. Improving the VMs access to limited GPU processing power in a system (e.g., a hypervisor or a server) can improve performance, e.g., in terms of processing speed and/or resource requirements.

SUMMARY OF THE INVENTION

In accordance with an embodiment, in a system comprising multiple virtual machines (VMs), a method for adaptive graphics rendering includes intercepting, at a first VM that does not have direct access to a graphics processing unit (GPU), a command from an application to render graphics, and processing the command using hardware based GPU rendering at a second VM that has direct access to a GPU in accordance to a workload of the GPU at the second VM.

In accordance with another embodiment, a network component configured for adaptive graphics rendering includes a first VM that does not have direct access to a GPU, a second VM that has direct access to a GPU and configured to communicate with the first VM to exchange data, a processor, and a computer readable storage medium storing programming for execution by the processor. The programming includes instructions to receive, at the first VM, a command from an application to render graphics and process the command using hardware based GPU rendering at the second VM in accordance to a workload of the GPU at the second VM.

In accordance with another embodiment, a method, in a VM, for adaptive graphics rendering includes receiving, form an application, an Open Graphics Library (OpenGL) command for graphics rendering, determining that the VM does not have direct access to a GPU, and upon determining that the VM does not have direct access to a GPU, determining to process the OpenGL command at a second VM that has direct access to a GPU in accordance to a workload of the GPU at the second VM. The method further includes upon determining to process the OpenGL command at a second VM that has direct access to a GPU, sending the OpenGL command with graphics data to the second VM and receiving rendered graphics from the second VM.

In accordance with another embodiment, a network component configured for adaptive graphics rendering includes a processor and a computer readable storage medium storing programming for execution by the processor. The programming includes instructions to receive, form an application, an OpenGL command for graphics rendering, determine that the VM does not have direct access to a GPU, and process the OpenGL command at a second VM that has direct access to a GPU upon determining that the GPU is free or has capacity to handle workload of the command.

In accordance with another embodiment, a method, in a VM, for adaptive graphics rendering includes receiving, form a second VM that does not have direct access to a GPU), an OpenGL command for graphics rendering, processing the OpenGL command with graphics data using a GPU at the VM, and sending rendered graphics to the second VM.

In accordance with yet another embodiment, a network component configured for adaptive graphics rendering includes a processor and a computer readable storage medium storing programming for execution by the processor. The programming includes instructions to receive, form a second VM that does not have direct access to a GPU, an OpenGL command for graphics rendering, process the OpenGL command with graphics data using a GPU at the VM, and send rendered graphics to the second VM.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for improving the performance of OpenGL graphics rendering on VM architecture. The system and method enables a plurality of VMs in a system (e.g., a hypervisor or a server) to access a limited number of available GPUs to perform hardware based rendering for OpenGL graphics, e.g., 3D graphics rendering. The VMs enable remote user devices (e.g., via remote desktop applications) to perform graphics rendering using the system's resource (e.g., GPU and memory) instead of the resources of the user devices. For example, only one or few of the system's VMs may have one or few dedicated GPUs. Enabling at least some of the remaining VMs to access and use the dedicate GPUs for hardware based rendering improves overall performance, for instance instead of limiting the remaining VMs to software based rendering. Specifically, commands for graphics rendering on any of the remaining VMs can be intercepted and sent to a VM with GPU access to use the GPU for hardware based rendering. The system and method are also adaptive to the workload and available resources of the system (e.g., the available or busy GPUs at the hypervisor or server). In the case of busy or unavailable GPUs, the intercepted command can be processed using software based rendering, e.g., using CPU.

Figure 1:
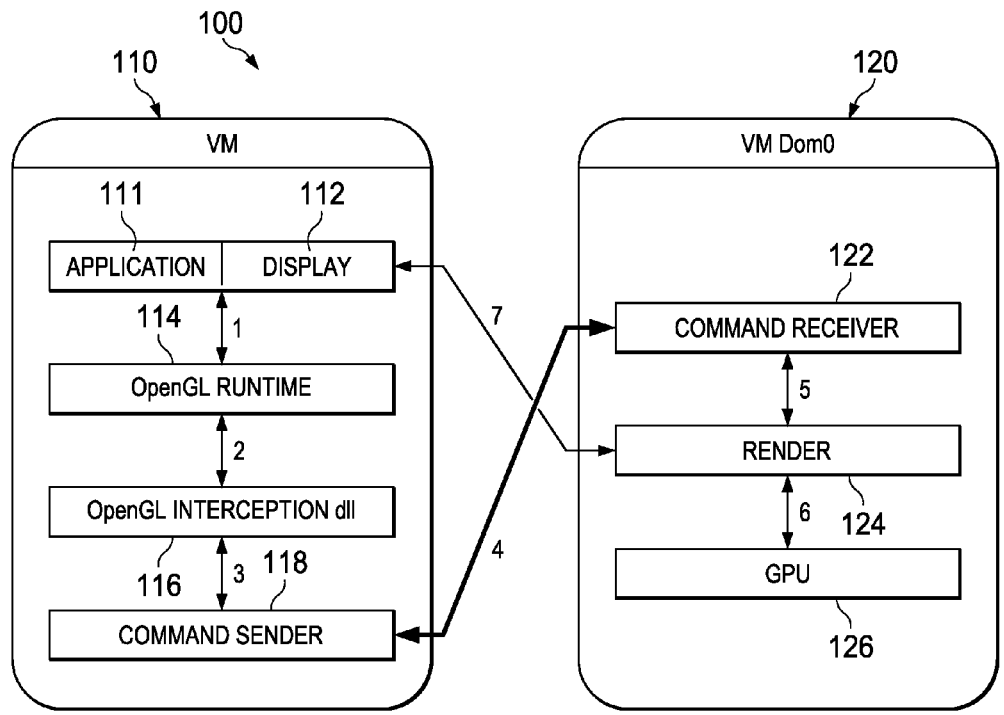
FIG. 1 is an embodiment of a hardware based virtual machine (VM) graphics rendering scheme.

FIG. 1 shows an embodiment of a hardware based VM graphics rendering scheme 100. The hardware based VM graphics rendering scheme 100 includes a plurality of VMs at a system, e.g., at a server or a hypervisor in a data center or a network. The VMs include one or more first VMs 110 that are not associated with a GPU, and one or more second VMs 120 that are associated with a GPU 126. As intended herein, a VM associated with a GPU can establish direct access to the GPU (without communicating with another VM) to render or process graphics data, while a VM that is no associated with a GPU can only use the GPU through communications with another VM. The one or more second VMs 120 may share one or more dedicated GPUs 126 or may each have a corresponding dedicated GPU 126. FIG. 1 shows one first VM 110 and one second VM 120, however the system may comprise any number of first VMs 110 (without GPU) and any number of second VMs 120 (with GPU).

Any of the VMs, including the first VM 110 and the second VM 120, may receive a request for OpenGL graphics rendering from a remote user, e.g., via remote desktop. The user device and/or the first VM 110 may include an application 111 and a display 112 for generating and displaying graphics, respectively. The graphics may be 2D or 3D graphics. For instance, the application 111 sends to an OpenGL runtime process 114 an OpenGL command (e.g., an application programming interface (API) call) to perform graphics rendering functions (e.g., for 3D graphics). An OpenGL interceptor 116 can then intercept the command at the OpenGL runtime process 114. The OpenGL interceptor 116 can be included in the OpenGL library, for example as a dynamic-link library (dll) file.

Upon intercepting the command, the OpenGL interceptor 116 forwards the command to a command sender 118 which allocates a second VM 120 that is associated with a GPU 126 sends the command to a command receiver 122 at the second VM 120. The second VM 120 that is associated with a GPU 126 includes a command receiver 122, which receives the OpenGL command and sends a command to a renderer 124 for processing the graphics for OpenGL hardware based rendering. The renderer 124 then interacts with the GPU 126 to render the graphics.

Graphics data are also forwarded with the command in the same path indicated above from the application 111/display 112 to the GPU 126. The rendered graphics data is then returned back from the GPU 126 to the application 111 and the display 112 via the same blocks/processes in the reverse order, as indicated by the double sided arrows in FIG. 1. The rendered graphics are then processed by the application 111 to display the graphics (e.g., 3D graphics) on the display 112. The command and the graphics data may be passed between the first VM 110 and the second VM 120, e.g., between the command sender 118 and the command receiver 122 via any suitable connection, link, and/or virtual network that is supported by the system to allow communications between VMs.

In the scheme 100, the different system blocks/processes at the first VM 110 and the second VM 120 can be implemented via software, hardware, or both. The scheme 100 may be managed or controlled by a manager process (e.g., via software) that communicates with the blocks/processes above or alternatively by the individual blocks/processes in a step by step. Further, the scheme 100 may include a decision step that, upon detecting the command from the application 111 and the display 112 at the first VM 110, decides using hardware based rendering using a GPU 126 at a second VM 120 to process the OpenGL command. In an embodiment, the decision may be made by the OpenGL runtime process 114 or the OpenGL interceptor 116. The decision to use hardware based rendering is based on the workload of the system, such as the amount of graphics data processed by the GPU(s) 126 in a server or hypervisor. In the case of relatively low workload, for instance in the case of available GPU(s) 126 with available capacity to process more workload, the scheme 100 is implemented to send the command and graphics data from the first VM 110 to the second VN 120 for OpenGL hardware based rendering using the GPU 126.

Figure 2:
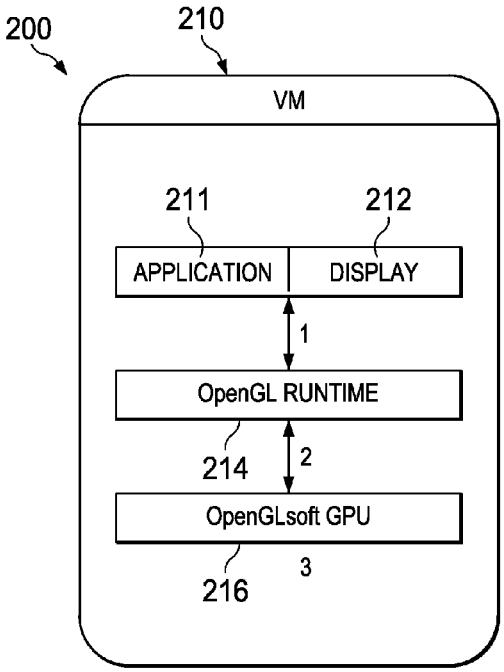
FIG. 2 is an embodiment of a software based VM graphics rendering scheme.

FIG. 2 shows an embodiment of a software based VM graphics rendering scheme 200. The software based VM graphics rendering scheme 200 includes a VM 210 at a system, e.g., at a server or a hypervisor in a data center or a network. The system may comprise a plurality of VMs that include VMs without direct GPU access. For instance, the VM 210 may not be associated with a GPU, similar to the first VM 110. The system may also include VMs associated with one or more GPUs (not shown). FIG. 2 shows one VM 210, however the system may comprise any number of VMs with and/or without GPU.

The VM 210 may receive a request for OpenGL graphics rendering from a remote user, e.g., via a remote desktop. The user device and/or the VM 210 may include an application 211 and a display 212 for generating and displaying graphics, respectively. The graphics may be 2D or 3D graphics. For instance, the application 211 sends to an OpenGL runtime process 214 an OpenGL command (e.g., an application programming interface (API) call) to perform graphics rendering functions (e.g., for 3D graphics). The OpenGL runtime process 214 forwards the command to an OpenGL software GPU 216 for processing the graphics uisng OpenGL software based rendering, e.g., using a CPU associated with the VM 210. The OpenGL software GPU 216 then interacts with the CPU (not shown) to render the graphics.

Graphics data are also forwarded with the command in the same path indicated above from the application 211/display 212 to the OpenGL software GPU 216 (and the CPU). The rendered graphics data is then returned back from to the application 211 and the display 212 via the same blocks/processes in the reverse order, as indicated by the double sided arrows in FIG. 2. The rendered graphics are then processed by the application 211 to display the graphics (e.g., 3D graphics) on the display 212. The command and the graphics data may be passed within the same VM 210 without communications with another VM in the system.

In the scheme 200, the different system blocks/processes at the VM 210 can be implemented via software, hardware, or both. The scheme 200 may be managed or controlled by a manager process (e.g., via software) that communicates with the blocks/processes above or alternatively by the individual blocks/processes in a step by step. Further, the scheme 200 may include a decision step that, upon detecting the command from the application 211 and the display 212 at the VM 210, decides using software based rendering (using an OpenGL software GPU 216) to process the OpenGL command. In an embodiment, the decision may be made by the OpenGL runtime process 214. The decision to use software based rendering is based on the workload of the system, such as the amount of graphics data processed by the GPU(s) in other VMs of the system, e.g., a server or hypervisor. In the case of relatively high workload, for instance busy GPU(s) with insufficient or substantially low capacity to process more workload, the scheme 200 is implemented to send the command and graphics data in the VM 210 for OpenGL software based rendering using OpenGL software GPU 216 (and a CPU).

Figure 3:
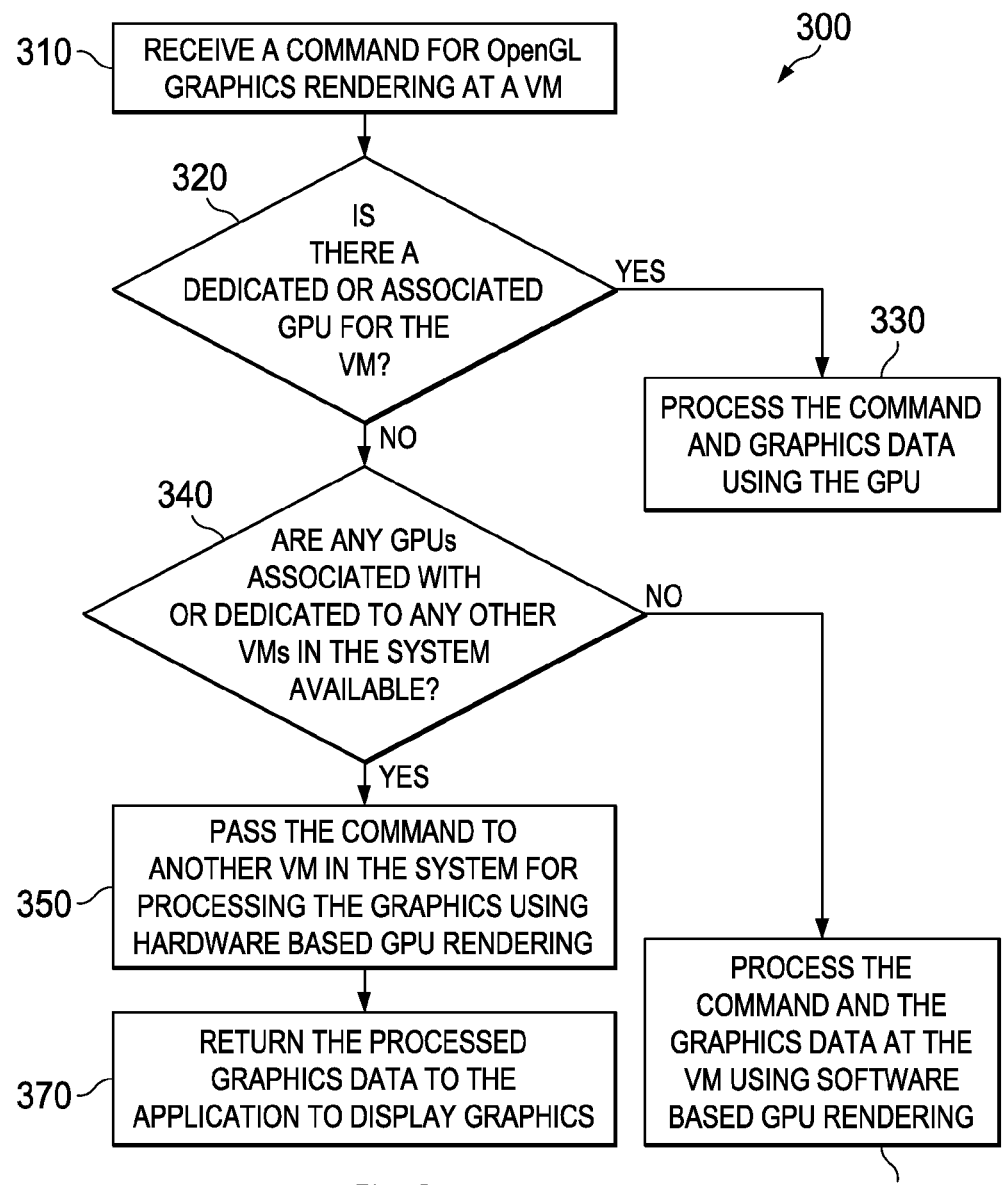
FIG. 3 is an embodiment of an adaptive VM graphics rendering method; 340 got YES/NO reversed.

FIG. 3 shows an embodiment method 300 for adaptive VM graphics rendering. The method 300 may be implemented at a VM that is part of a system comprising multiple VMs, such as a server or a hypervisor, for example at an OpenGL runtime process running in the VM or an OpenGL interception dll. Alternatively, the method 300 may be implemented by a manager process that communicates with processes in different VMs of the system. The method 300 determines whether to process an incoming command for graphics rendering using hardware based or software based GPU according to the workload of the system's GPU(s) and optionally other criteria, such as other available resources, type of graphics data, user preference, priority, etc.

At step 310, a command for OpenGL graphics rendering is received at a VM. For example, the OpenGL runtime process detects an API call from an application to render graphics using OpenGL. At step 320, the method 300 determines whether the VM has an assigned or dedicated GPU. If the condition in step 320 is true, then the method 300 proceeds to step 330. Otherwise the method 300 proceeds to step 340. At step 330, the command and graphics data are processed using the GPU. At step 340, the method 300 determines whether one or more GPUs associated with or dedicated to one or more other VMs in the system are available, e.g., based on workload and optionally other criteria. If the condition in step 340 is true, then the method 300 proceeds to step 350. Otherwise the method 300 proceeds to step 360. At step 350, the command is passed to another VM in the system for processing the graphics using hardware based GPU rendering. At step 360, the command and the graphics data are processed at the VM using software based GPU rendering. At step 370, the processed graphics data is returned to the application to display graphics. In another embodiment, the method 300 may be implemented at a VM that is not associated with a GPU or that has no dedicated GPU. As such, the step 320 is skipped.

Figure 4:
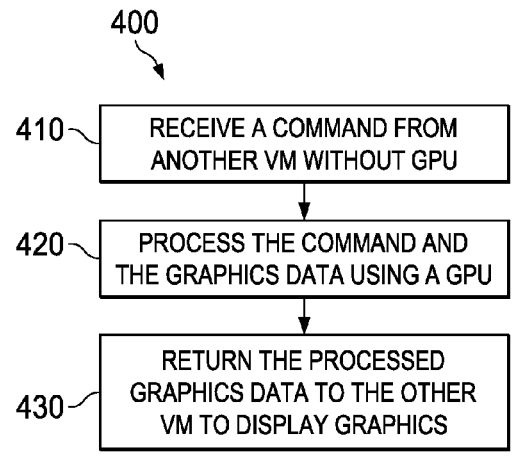
FIG. 4 is another embodiment of an adaptive VM graphics rendering method.

FIG. 4 shows an embodiment or another method 400 for adaptive VM graphics rendering. The method 400 may be implemented at a VM that is part of a system comprising multiple VMs, such as a server or a hypervisor. The VM is associated with a GPU or has a dedicated GPU. Alternatively, the method 400 may be implemented by a manager process that communicates with processes in different VMs of the system. The method 400 is implemented upon determining to process an incoming command for graphics rendering using hardware based GPU based on the workload of the system and optionally other criteria, such as other available resources, type of graphics data, user preference, priority, etc. The incoming command is sent from another VM of the system that is not associated with or has no dedicated GPU. At step 410, the command is received from the other VM without GPU, e.g., via a command sender at the other VM. At step 420, the command and the graphics data is processed using a GPU. At step 430, the processed graphics data is returned to the other VM to display graphics.

Figure 5:
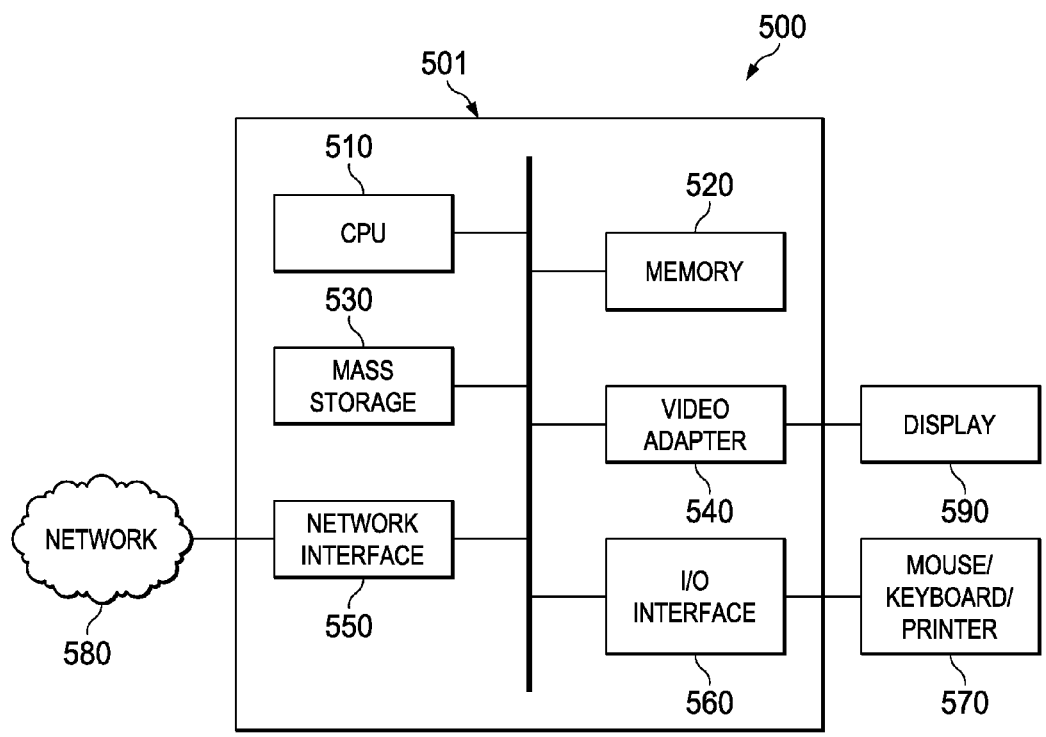
FIG. 5 is a processing system that can be used to implement various embodiments.

FIG. 5 is a block diagram of a processing system 500 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptive graphics rendering, the method comprising:

receiving, at a first virtual machine (VM), from an application, an Open Graphics Library (OpenGL) command for graphics rendering, the first VM comprising a central processing unit (CPU);

determining whether a hardware based graphics processing unit (GPU) of second VMs, which have direct access to the GPU, is busy or has substantially low processing capacity, wherein the first VM is configured to use the GPU through the second VMs;

forwarding the OpenGL command from the first VM to the second VMs when the GPU has enough capacity to handle a workload of the OpenGL command; and processing the OpenGL command using software rendering running on the CPU at the first VM when the GPU of the second VMs is busy or does not have capacity to handle the workload of the OpenGL command.

2. The method of claim 1, further comprising processing the OpenGL command at the second VMs using the GPU upon determining that the GPU is free or has capacity to handle the workload of the OpenGL command.

3. The method of claim 1, further comprising establishing a links between the first VM and the second VMs to send the OpenGL command with graphics data and receive rendered graphics.

4. The method of claim 1, wherein the first VM comprises a plurality of first VMs.

5. The method of claim 1, wherein the second VMs comprise GPUs.

6. The method of claim 1, wherein the first VM does not comprise the GPU.

7. A network component configured for adaptive graphics rendering, the network component comprising:

a processor; and a non-transitory computer readable storage medium storing programming for execution by the processor, the programming including instructions to:

receive, at a first virtual machine (VM), from an application, an Open Graphics Library (OpenGL) command for graphics rendering;

determine whether a hardware based graphics processing unit (GPU) of second VMs, which have direct access to the GPU, is busy or has substantially low processing capacity, wherein the first VM is configured to use the GPU through the second VMs;

forward the OpenGL command from the first VM to the second VMs when the GPU has enough capacity to handle a workload of the OpenGL command, wherein the first and second VMs are associated with the network component; and process the OpenGL command using software rendering running on a central processing unit (CPU) at the first VM when the GPU of the second VMs is busy or does not have a capacity to handle the OpenGL command.

8. The network component of claim 7, wherein the programming includes further instructions to:

establish links with the second VMs;

send, over the links, the OpenGL command with graphics data to the second VMs; and receive, over the links, rendered graphics from the second VMs.

9. The network component of claim 7, wherein the programming includes further instructions to process the OpenGL command at the second VMs, which have direct access to the GPU, upon determining that the GPU is free or has a capacity to handle a workload of the OpenGL command.

10. The network component of claim 7, wherein the first VM comprises a plurality of first VMs.

11. The network component of claim 7, wherein the second VMs comprise GPUs VM comprises the CPU.

12. The network component of claim 7, wherein the first VM does not comprise the GPU.

* * * * *

UNITED STATES PATENT AND TRADEMARK OFFICE
CERTIFICATE OF CORRECTION

PATENT NO. : 9,665,921 B2  
APPLICATION NO. : 13/730876  
DATED : May 30, 2017  
INVENTOR(S) : Guangsong Xia Page 1 of 1

It is certified that error appears in the above-identified patent and that said Letters Patent is hereby corrected as shown below:

In the Claims

In Column 8, Line 42, Claim 11, delete "second VMs comprise GPUs VM comprises the CPU" and insert --second VMs comprise GPUs--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*